United States Patent [19]

Rose

[11] 4,062,171
[45] Dec. 13, 1977

[54] CUTTER BLADE ASSEMBLY
[75] Inventor: Jack Howard Rose, Livonia, Mich.
[73] Assignee: Massey-Ferguson Inc., Detroit, Mich.
[21] Appl. No.: 719,028
[22] Filed: Aug. 30, 1976
[51] Int. Cl.² ............................................. A01D 55/18
[52] U.S. Cl. .................................................. 56/295
[58] Field of Search ......................................... 56/295
[56] References Cited
U.S. PATENT DOCUMENTS
2,939,264 6/1960 Kontis .................................... 56/295
3,158,977 12/1964 Williams ................................ 56/295

Primary Examiner—Jay N. Eskovitz
Attorney, Agent, or Firm—William R. Nolte

[57] ABSTRACT

Two blades of the cutter blade assembly are pivotally mounted separately by means of a coupler on opposite sides of a drive shaft and move to an extended position by centrifugal force. Upon one blade striking an inseverable object both blades are caused to move to a retracted position. In moving from the extended position to the retracted position the impacted blade coacts with the opposite blade to move the latter to a retracted position.

9 Claims, 4 Drawing Figures

CUTTER BLADE ASSEMBLY

This invention relates to lawn mower cutter blade assmeblies and more particularly to the mounting of cutter blades so that the blades move from an extended position to a retracted position on striking an object that is unsevered by the blades.

Lawn mowers and the like cut by rotating blades. The mowers are known as rotary mowers and the blades are horizontal for cutting. The drive shaft of the mower is vertical and the cutting assembly extends on both sides to form two cutting blades. Thus a plurality of cutter blades are provided.

Usually the cutting assembly engages severable objects. On occasion an object is encountered which cannot be severed such as a rock or steel peg. The motor driven by the cutting assembly is stalled or the blades may break on impact. If the blades are pivotally mounted there is the possibility that they will contact.

It is therefore desirable that the blades do not contact and that the drive train between the motor and blades is not damaged. It is also desirable that a wide swath be cut.

An object of this invention is to provide a cutter assembly with blades that coact on impact of one blade with an unseverable object.

A further object of the invention is to provide a cutter assembly that does not damage the drive train between the motor and the blades when a blade contacts an unseverable object.

Other objects and advantages will be readily apparent from the following specification and the drawings.

A lawn mower cutter blade assembly has a retracted position and an extended position and a plurality of cutter blades. The assembly is driven by a shaft connected to a motor. Each blade is pivotally mounted about an axis spaced from the axis of the shaft and from the other axes. Coaction occurs between the blades when one of the blades engages an unseverable object. The assembly on impact is actuated to the retracted position.

Figure 4:
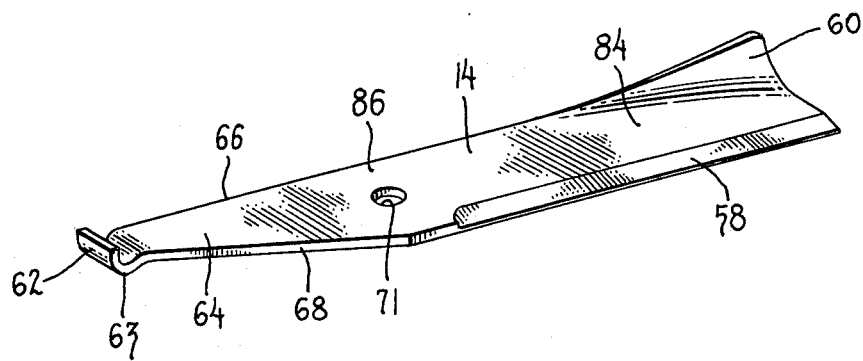
FIG. 4 is a perspective view of a blade

A cutter blade assembly 10 has a plurality of blades 12, 14. In this embodiment the assembly has two blades 12, 14. One is shown in FIG. 4. The assembly is housed in a shroud 16 to protect outsiders from the blades. The assembly 10 is driven by the shaft 18 through the coupling or coupler 20. The shaft of the coupler is the drive means for the blades. The shaft runs in bearings (not shown) in housings 22 and 24. The coupling 20 comprises the hub 26; the crosspiece 28; the bolts 30, 32 and nuts 34, 36; sleeves 38, 40 are on bolts 30, 32; and the plates 42. Washers 44, 46 are between the respective nuts 34, 36. The heads 48, 50 are welded at 54, 56. One of the blades, in this instance the blade 14 is shown in FIG. 4. In this FIGURE the blade 14 comprises a cutting edge 58, a turned corner 60 and the turned tip 62. The non-cutting end 64 is tapered towards the tip 62. The tip is narrower than the portion of the blade in back of the cutting edge. The back edge 66 is straight and the front edge 68 of the non-cutting end 64 is at an angle thereby narrowing the end 64. In the center portion of the blade 14 is the mounting hole 71.

Figure 1:
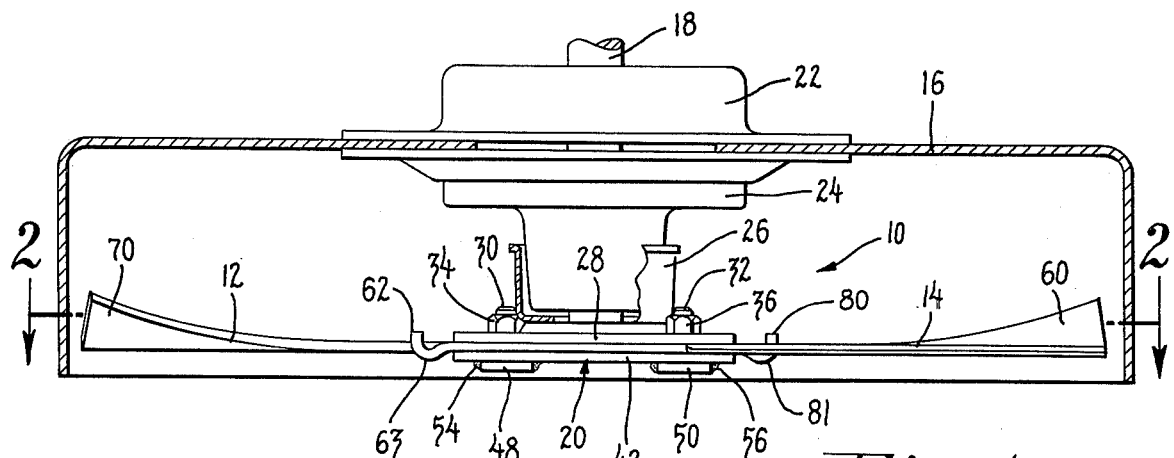
FIG. 1 is a side view of the cutter blade assembly with the shroud of the mower in section and a side view of the coupling between the assembly and the motor.
Figure 2:
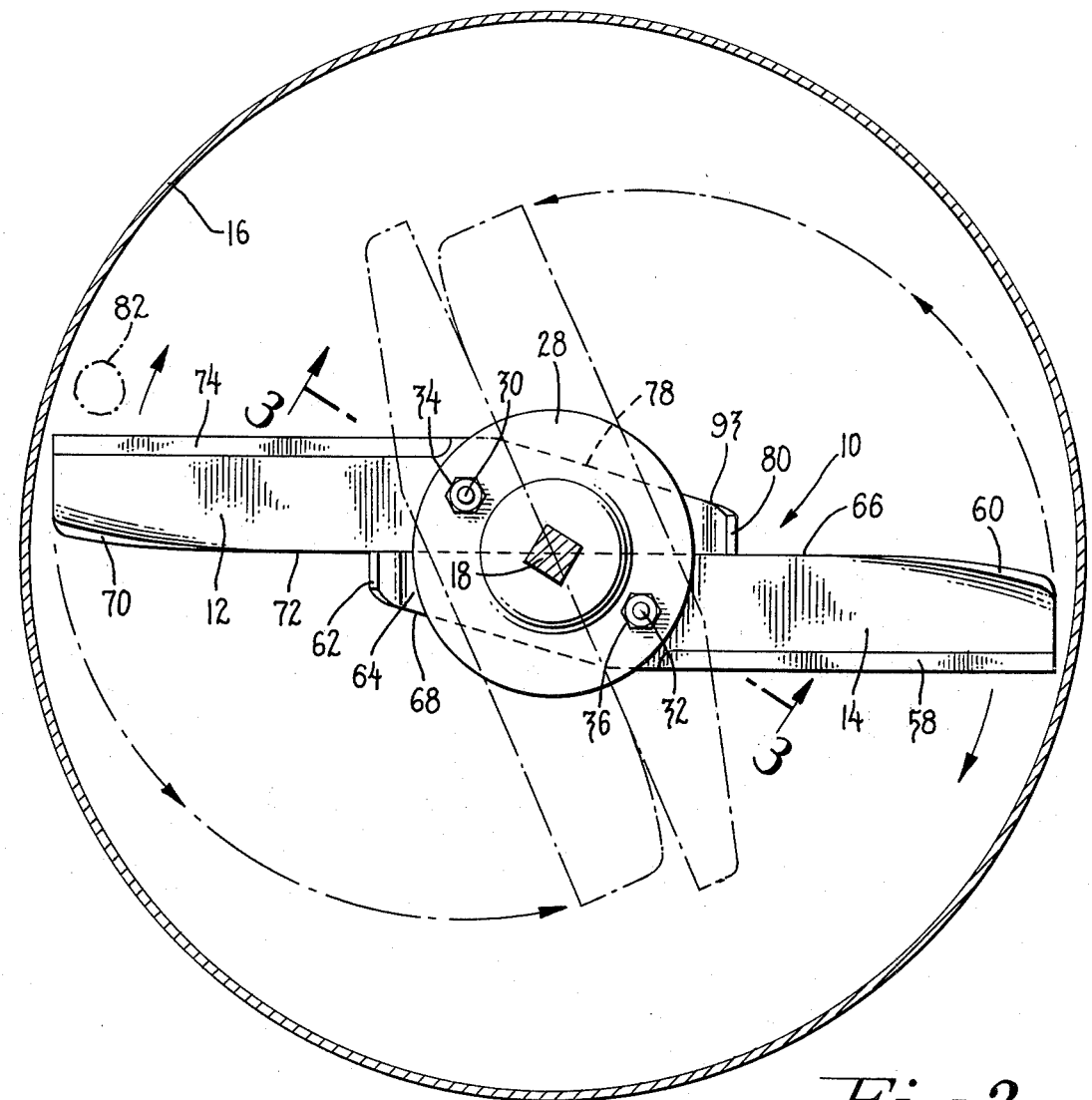
FIG. 2 is a top view of the assembly taken along line 2—2 of FIG. 1.
Figure 3:
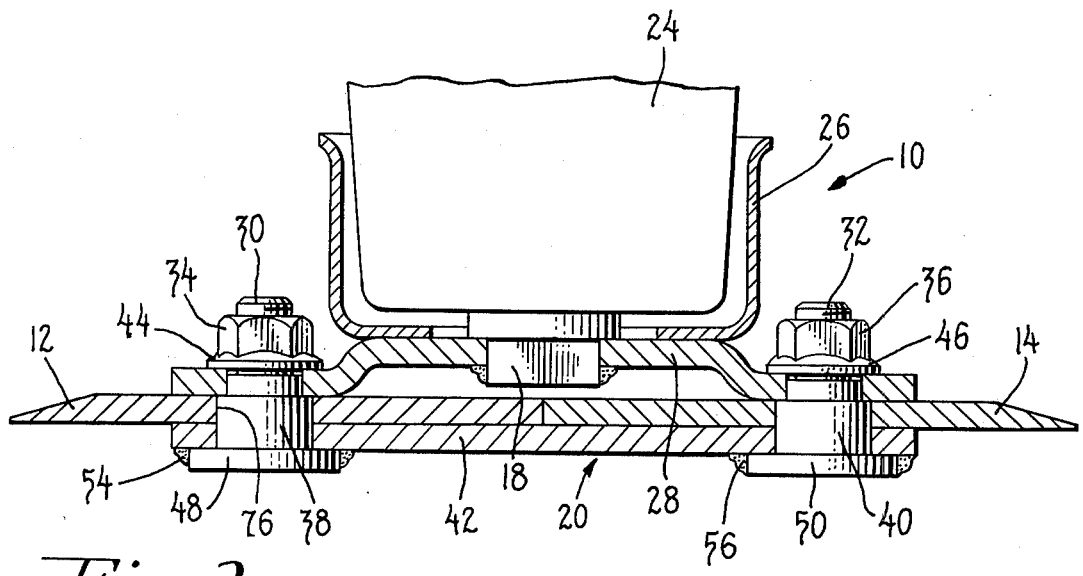
FIG. 3 is an enlarged and sectional view of the assembly in the retracted position taken along line 3—3 of FIG. 2.

The blade 12 is the same as blade 14 and has a back edge or surface which in the extended position and the retracted position is against the back edge or surface 66 of the blade 14. The back edge 72 of the blade 12 has a turned corner 70. The cutting edge 74 extends along the blade 12 up to the mounting hole 76 (FIG. 2). The other end is tapered by edge 78 being sloped or angled towards the back edge. The blade 12 has an end 80 which engages the back edge 66 of blade 14.

In FIG. 2 the blades 12 and 14 are shown (in solid lines) in the extended position and (in the dot-dash lines) in the retracted position. When cutting grass or the like or any severable material the blades are normally in the extended position. If blade 12 strikes an object 82 such as a rock or steel peg at the outer part of the cutting edge 74, the end 80 moves forward by pivoting about the nut 34. This spaces the end 80 and the back edge 66 of blade 14. The end 62 of blade 14 engages the back edge 72 of the striking blade 12. This action causes the blades to pivot counter-clockwise in the embodiment as shown in FIG. 2 to the retracted position.

The shaft 18 and coupling 20 continue to rotate clockwise carrying the blades 12 and 14 into the retracted position. Thus the next blade misses the non-severable object. Further the blades continue to rotate along the coupling 20 and the drive shaft 18 coupled to the motor. The motor does not stall or lose the drive chain, for example the timing belt, gearing etc.

The blades are placed in the extended position by centrifugal force and when rotating have a large operating diameter and when in the retracted position having a smaller diameter. As seen from FIG. 2 of the drawings, in the retracted position the blades are still cutting.

The drawings illustrate the mower rotating in one direction. By redesigning the parts of the mower it can rotate in the opposite direction. The ends 62 and 80 are at ninety degrees in relation to the main portion of a respective blade to prevent overlapping of the blades on impact of one of the blades. This is when the blades engage, however, other means may be provided. In moving from the expanded position to the retracted position, the ends 62 and 80 slide along the back edges 72, 66 respectively and comprise coacting means or members. The ends 62 and 80 are at an angle to and normal to the respective blades 12, 14. When the coacting means is at an angle or normal to the blade, the blades will not overlap on retraction. Troughs 63 and 81 are provided. The upturning of the ends 62 and 80 insure the engagement of the blades.

Each blade as represented by the blade in FIG. 4 has a cutting portion 84 with cutting edge 58 and a turned corner 60, a mounting portion 86 with hole 71, and an end portion 64 with a tip 62. The blade is flat and the various portions are in the same plane. As As to dimensions the length of the blade extends longitudinally. The lateral dimension is normal thereto and the thickness is the depth. The mounting portion is inbetween the cutting portion and the end portion. The holes, the nuts and bolts, and the sleeves are pivotal mounts or pivotal means for mounting the blades.

This invention is useful in walking type mowers, riding mowers and tractors with mowing attachments particularly in-line mowers.

An embodiment of the invention is shown and described. Modification and other embodiments are readily apparent and within the scope of the invention as defined in the following claims.

I claim:

1. A lawn mower cutter blade assembly having a plurality of cutter blades movable between extended and retracted position, drive means including a shaft, means for pivotally mounting said blades on said drive means, and each blade pivoting about a separate axis radially outwardly from said shaft, the improvement comprising, means for coacting between said blades upon the striking of an unseverable object by one of said blades, and said coacting means being spaced radially outwardly of said means for pivotally mounting said blades.

2. An assembly as set forth in claim 1 wherein said drive means including a shaft has a coupler attached to said shaft, whereby when said assembly is in its extended position said shaft is between said coacting means and said pivotal means of a respective blade.

3. An assembly as set forth in claim 2 wherein said coacting means is on each blade.

4. An assembly as set forth in claim 1 wherein said assembly is two cutter blades and said coupler is a single cross-piece pivotally connecting said blades.

5. An assembly as set forth in claim 1 wherein each blade has a cutting portion, a mounting portion and an end portion, and said mounting portion is between said cutting portion ans said end portion.

6. An assembly as set forth in claim 5 wherein said cutting portion has a uniform longitudinal dimension.

7. An assembly as set forth in claim 6 wherein said end portion includes a tip portion at an angle to the plane of said respective end portion.

8. An assembly as set forth in claim 7 wherein said tip portion is normal to the plane of said respective end portion.

9. An assembly as set forth in claim 8 wherein said cutting portion, said mounting portion and said end portion are in the same plane.

* * * * *